(12) United States Patent
Choi et al.

(10) Patent No.: US 11,274,060 B2
(45) Date of Patent: Mar. 15, 2022

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Suyeon Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 16/795,923

(22) Filed: Feb. 20, 2020

(65) Prior Publication Data

US 2020/0270166 A1    Aug. 27, 2020

(30) Foreign Application Priority Data

Feb. 22, 2019    (KR) .......................... 10-2019-0021139

(51) Int. Cl.
*C03C 8/04*    (2006.01)
*C03C 8/06*    (2006.01)
(Continued)

(52) U.S. Cl.
CPC ................. *C03C 8/02* (2013.01); *C03C 8/16* (2013.01); *C03C 8/20* (2013.01); *F24C 15/005* (2013.01); *C03C 2207/04* (2013.01)

(58) Field of Classification Search
CPC ..................................... C03C 8/04; C03C 8/06
See application file for complete search history.

(56) References Cited

U.S. PATENT DOCUMENTS 3,547,098 A    12/1970    Lee
3,718,498 A    2/1973    Denny et al.
(Continued)

FOREIGN PATENT DOCUMENTS

AU    2370367    1/1969
BG    98027    3/1994
(Continued)

OTHER PUBLICATIONS

United States Office Action dated Mar. 25, 2021 issued in co-pending related U.S. Appl. No. 16/666,979.
(Continued)

*Primary Examiner* — Karl E Group
(74) *Attorney, Agent, or Firm* — Ked & Associates LLP

(57) ABSTRACT

An enamel composition, a method for preparing an enamel composition, and a cooking appliance are provided. The enamel composition may include 20 to 50% by weight of silicon dioxide ($SiO_2$), 7 to 12% by weight of boron oxide ($B_2O_3$), one or more of lithium superoxide ($Li_2O$), sodium oxide ($Na_2O$), or potassium oxide ($K_2O$), and 10 to 20% by weight of sodium fluoride (NaF), 1 to 10% by weight of zinc oxide (ZnO), and one or more of molybdenum oxide ($MoO_3$), bismuth oxide ($Bi_2O_3$), or cerium dioxide ($CeO_2$), and 10 to 40% by weight of titanium dioxide ($TiO_2$). With such an enamel composition, cleaning is possible in a heating condition of a relatively low temperature and without a soaking process using water.

20 Claims, 4 Drawing Sheets

(51) Int. Cl.
*F24C 15/00* (2006.01)
*C03C 8/02* (2006.01)
*C03C 8/16* (2006.01)
*C03C 8/20* (2006.01)

(56) References Cited

U.S. PATENT DOCUMENTS

| | | |
|---|---|---|
| 4,084,975 A | 4/1978 | Faust |
| 4,147,835 A | 4/1979 | Nishino et al. |
| 4,180,482 A | 12/1979 | Nishino et al. |
| 4,460,630 A | 7/1984 | Nishino et al. |
| 4,515,862 A | 5/1985 | Maki et al. |
| 4,877,758 A | 10/1989 | Lee et al. |
| 5,650,364 A | 7/1997 | Münstedt et al. |
| 5,747,395 A | 5/1998 | Smith et al. |
| 6,123,874 A | 9/2000 | Fukaya et al. |
| 6,321,569 B1 | 11/2001 | Sreeram et al. |
| 6,429,161 B1 | 8/2002 | Souchard et al. |
| 6,566,289 B2 | 5/2003 | Aronica et al. |
| 7,763,557 B2 | 7/2010 | Baldwin et al. |
| 2003/0119647 A1 | 6/2003 | Sanichi et al. |
| 2003/0187118 A1 | 10/2003 | Aronica et al. |
| 2004/0043053 A1 | 3/2004 | Yu et al. |
| 2004/0069764 A1 | 4/2004 | Imai et al. |
| 2005/0148722 A1 | 7/2005 | Aronica et al. |
| 2008/0044488 A1 | 2/2008 | Zimmer et al. |
| 2009/0311514 A1 | 12/2009 | Shon et al. |
| 2010/0009837 A1 | 1/2010 | Sakoske |
| 2010/0264126 A1 | 10/2010 | Baek et al. |
| 2011/0011423 A1 | 1/2011 | Baek et al. |
| 2011/0049122 A1 | 3/2011 | Baek et al. |
| 2011/0174826 A1 | 7/2011 | Le Bris et al. |
| 2011/0262758 A1 | 10/2011 | Benford, Jr. et al. |
| 2011/0277505 A1 | 11/2011 | Sakoske |
| 2013/0149444 A1 | 6/2013 | Le Bris et al. |
| 2013/0299482 A1 | 11/2013 | Kim et al. |
| 2013/0299484 A1 | 11/2013 | Lee et al. |
| 2015/0083109 A1 | 3/2015 | Baek et al. |
| 2018/0170797 A1 | 6/2018 | Gorecki et al. |
| 2018/0215654 A1 | 8/2018 | Choi et al. |
| 2018/0215655 A1 | 8/2018 | Kim et al. |
| 2019/0002336 A1 | 1/2019 | Kim et al. |
| 2019/0092680 A1 | 3/2019 | Kim et al. |
| 2019/0337837 A1 | 11/2019 | Kim et al. |
| 2020/0115274 A1 | 4/2020 | Awagakubo et al. |
| 2020/0148583 A1 | 5/2020 | Choi et al. |
| 2020/0270167 A1 | 8/2020 | Choi et al. |
| 2020/0270168 A1 | 8/2020 | Choi et al. |
| 2020/0270171 A1* | 8/2020 | Gwoo ............... A47J 36/04 |

FOREIGN PATENT DOCUMENTS

| | | |
|---|---|---|
| CN | 1042890 | 6/1990 |
| CN | 1105343 | 7/1995 |
| CN | 1108626 | 9/1995 |
| CN | 1176942 | 3/1998 |
| CN | 1487240 | 4/2004 |
| CN | 101067207 | 11/2007 |
| CN | 101094818 | 12/2007 |
| CN | 101182119 | 5/2008 |
| CN | 101519276 | 9/2009 |
| CN | 101734858 | 6/2010 |
| CN | 102066011 | 5/2011 |
| CN | 102089253 | 6/2011 |
| CN | 102219383 | 10/2011 |
| CN | 102368933 | 3/2012 |
| CN | 102422085 | 4/2012 |
| CN | 104891805 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| EP | 0 086 109 | 8/1983 |
| EP | 0 453 897 | 10/1991 |
| EP | 0 565 941 | 10/1993 |
| EP | 1 160 283 | 12/2001 |
| EP | 1256 556 | 11/2002 |
| EP | 1 298 099 | 4/2003 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| GB | 1214 261 | 12/1970 |
| HU | 01 00796 | 8/2002 |
| JP | S54-77618 | 6/1979 |
| JP | S54-106529 | 8/1979 |
| JP | 54153819 A * | 12/1979 |
| JP | S55-75740 | 6/1980 |
| JP | S56-78450 | 6/1981 |
| JP | S63-230537 | 9/1988 |
| JP | S63-230538 | 9/1988 |
| JP | 2001-080935 | 3/2001 |
| JP | 2001-303276 | 10/2001 |
| JP | 2002-367510 | 12/2002 |
| JP | 2003-206417 | 7/2003 |
| JP | 2004-269322 | 9/2004 |
| JP | 2004-358846 | 12/2004 |
| JP | 2005-008974 | 1/2005 |
| JP | 2014-148465 | 8/2014 |
| JP | 2014-221937 | 11/2014 |
| JP | 2016-030849 | 3/2016 |
| KR | 10-2011-0023079 | 3/2011 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089986 | 8/2018 |
| KR | 10-2018-0089988 | 8/2018 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2018/143704 | 8/2018 |
| WO | WO 2018/198986 | 11/2018 |
| WO | WO 2019/203565 | 10/2019 |

OTHER PUBLICATIONS

United States Office Action dated Apr. 6, 2021 issued in co-pending related U.S. Appl. No. 16/676,903.
Chinese Office Action dated Jul. 26, 2021 issued in CN Application No. 1911042287.3.
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
European Search Report dated Mar. 24, 2020 issued in Application No. 19207979.6.
U.S. Appl. No. 16/666,979, filed Oct. 29, 2019.
U.S. Appl. No. 16/676,903, filed Nov. 7, 2019.
U.S. Appl. No. 16/795,959, filed Feb. 20, 2020.
U.S. Appl. No. 16/796,066, filed Feb. 20, 2020.
U.S. Appl. No. 16/796,052, filed Feb. 20, 2020.
U.S. Appl. No. 16/796,075, filed Feb. 20, 2020.
U.S. Appl. No. 16/796,102, filed Feb. 20, 2020.

(56) References Cited

OTHER PUBLICATIONS

U.S. Appl. No. 16/796,127, filed Feb. 20, 2020.
European Search Repot dated Mar. 24, 2020 issued in Application No. 19205924.4.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.

* cited by examiner

ENAMEL COMPOSITION, METHOD FOR PREPARING ENAMEL COMPOSITION, AND COOKING APPLIANCE

CROSS-REFERENCE TO RELATED APPLICATION(S)

The present disclosure claims priority to and the benefit of Korean Patent Application No. 10-2019-0021139, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamel is a glassy glaze applied to a surface of a metal plate. Generally enamel is used for appliances, such as microwaves and ovens, for example. Appliances, such as electric ovens and gas ovens, for example, are appliances for cooking food or other items (hereinafter, collectively "food") using a heating source. However, contaminants occur during a cooking process and adhere to an inner wall of a cavity of the cooking appliance, so that the inner wall of the cavity needs to be cleaned. The enamel is coated on a surface of the inner wall of the cavity of the cooking appliance and eases removal of the contaminants fixed to the cooking appliance. In general, a pyrolysis method of reducing contaminants to ashes by combusting at a high temperature is known as a technology for easily cleaning the inner wall of the cavity. An enamel composition including phosphorus pentoxide ($P_2O_5$), silicon dioxide ($SiO_2$), and boron oxide ($B_2O_3$), for example, is known as the enamel composition to which the pyrolysis method is applied.

However, the enamel composition which is conventionally known needs a high temperature of 450 to 500° C. for pyrolysis. If an enamel coating layer is heated for a long time at the high temperature, there is a problem in that a durability of the enamel coating layer may be weakened. Also, the known enamel composition must be heated at a high temperature, so that energy consumption needed for cleaning is a huge problem. In addition, the known enamel composition needs a soaking process using water for a predetermined amount of time to remove oil-based contaminants, such as oil of a cow, a pig, or poultry, so that there is a problem in that a cleaning process is complicated.

BRIEF DESCRIPTION OF THE DRAWINGS

Embodiments will be described in detail with reference to the following drawings in which like reference numerals refer to like elements, and wherein.

DETAILED DESCRIPTION

Enamel Composition

Figure 1:
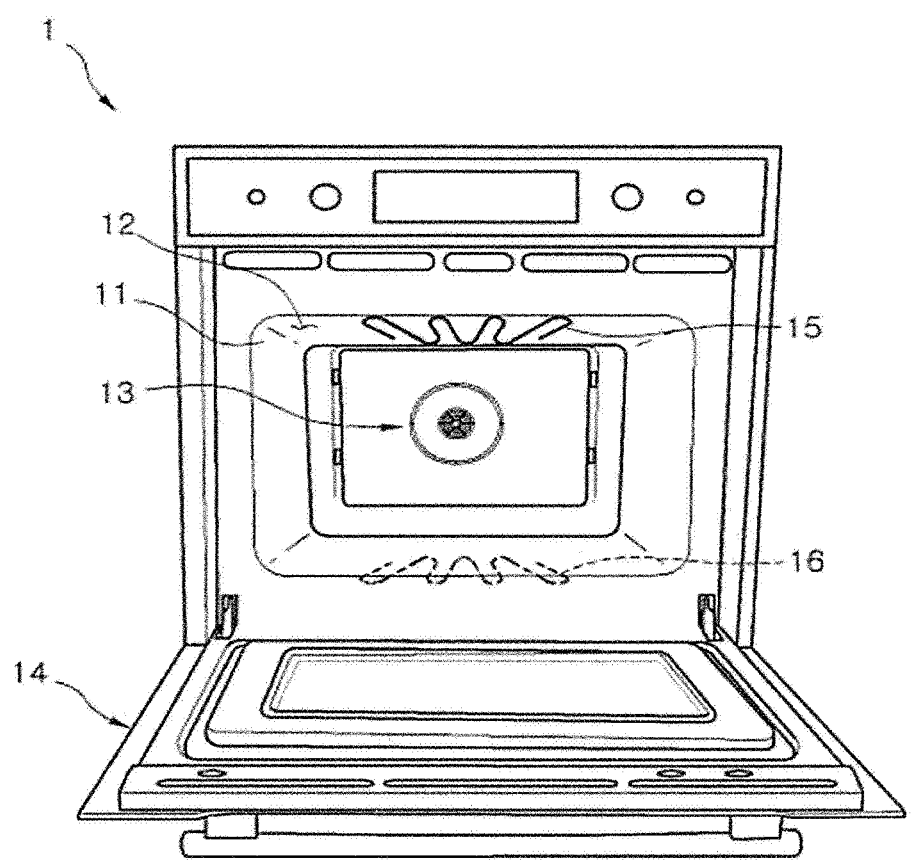
FIG. 1 is a perspective view of a cooking appliance according to an embodiment.

An enamel composition according to embodiments may include 20 to 50% by weight of silicon dioxide ($SiO_2$), 7 to 12% by weight of boron oxide ($B_2O_3$), one or more of lithium superoxide ($Li_2O$), sodium oxide ($Na_2O$), or potassium oxide ($K_2O$), and 10 to 20% by weight of sodium fluoride (NaF), 1 to 10% by weight of zinc oxide (ZnO), and one or more of molybdenum oxide ($MoO_3$), bismuth oxide ($Bi_2O_3$), or cerium dioxide ($CeO_2$), and 10 to 40% by weight of titanium dioxide ($TiO_2$).

$SiO_2$ is a component forming a glass structure with a strengthened frame, enhanced chemical resistance, and easy expression of characteristics of a metal oxide acting as a catalyst. A catalytic metal oxide is inferior with respect to thermal resistance or chemical resistance compared with other components, so that a catalytic metal oxide cannot be included in a large amount. However, $SiO_2$ has a structure having a large pore size, so that $SiO_2$ may be included in a proper amount in a glass composition. Solubility of a catalytic metal oxide within glass may be enhanced. Accordingly, if a content ratio of $SiO_2$ and a catalytic metal oxide is property controlled, excellent thermal resistance and chemical resistance may be obtained and characteristics of a catalytic metal oxide may be expressed. $SiO_2$ may be included in the enamel composition in a range of 20 to 50% by weight. If $SiO_2$ is more than 50% by weight, addition of other components is interfered with, so that a problem in that a cleaning function is lowered. If $SiO_2$ is less than 20% by weight, a problem in that collapse of a silicate-based glass composition according to embodiments may occur.

$B_2O_3$ has a role of a glass former, and is a component that has a role of melting uniformly each of the components of the enamel composition. Also, $B_2O_3$ has a role of controlling a coefficient of thermal expansion and a fusion flow of the enamel composition, thereby enhancing a coating performance. In addition, $B_2O_3$ has a role of maintaining proper viscosity upon a calcination process of enamel in order that crystallization of a glass composition does not occur. $B_2O_3$ is contained in the enamel composition in a range of 7 to 12% by weight. If $B_2O_3$ is more than 12% by weight, addition of other components is interfered with, so that a problem in that a cleaning function is lowered. If $B_2O_3$ is less than 7% by weight, crystallization of a glass composition may occur.

$Li_2O$, $Na_2O$, and $K_2O$, and NaF have a role of enhancing a cleaning function of the enamel composition. One or more of $Li_2O$, $Na_2O$, or $K_2O$, and 10 to 20% by weight of NaF are contained in the enamel composition. With respect to one or more of $Li_2O$, $Na_2O$, or $K_2O$, if NaF is more than 20% by weight, a coefficient of thermal expansion of glass is extremely increased, so that there may be a problem in that a coating performance is lowered. With respect to the one or more of $Li_2O$, $Na_2O$, or $K_2O$, if NaF is less than 10% by weight, there may be a problem in that a cleaning function is lowered.

In embodiments, $SiO_2$ and $B_2O_3$ have a role of a network formation oxide and the above-referred alkali metal oxide has a role of a network modification oxide while ZnO has a role of an intermediate oxide for balancing the above two metal oxides. In embodiments, ZnO is contained in a range of 1 to 10% by weight in the enamel composition. If ZnO is more than 10% by weight, there may be a problem in that glassification is difficult and a thermophysical property is lowered. Also, if ZnO is less than 1% by weight, spreadability of the enamel composition is reduced upon calcinating. Accordingly, there may be a problem in that a coating is not uniform and surface characteristics of a coating layer and a coating performance are lowered.

The one or more of $MoO_3$, $Bi_2O_3$, or $CeO_2$, and $TiO_2$ are components which enhance cleaning performance of contaminants, such as oil-based contaminants or saccharides. In embodiments, one or more of $MoO_3$, $Bi_2O_3$, or $CeO_2$ and 10 to 40% by weight of $TiO_2$ are contained in the enamel composition. The $TiO_2$ is a component for enhancing a cleaning performance with respect to oil (fat)-type contaminants. Also, $MoO_3$ is also a component for enhancing a cleaning performance with respect to oil (fat)-type contaminants. $Bi_2O_3$, and $CeO_2$ are components for enhancing a cleaning performance with respect to saccharide contaminants mainly. With respect to the one or more of $MoO_3$, $Bi_2O_3$, or $CeO_2$, if $TiO_2$ is more than 40% by weight, addition of other components is interfered with, so that a problem in that a function, such as glass forming ability and durability, is reduced may occur. Also, with respect to the one or more of $MoO_3$, $Bi_2O_3$, or $CeO_2$, if $TiO_2$ is less than 10% by weight, a cleaning performance with respect to contaminants, such as oil-based contaminants and saccharides, may be weakened. In order to provide a silicate-based composition ratio having an excellent cleaning performance, heat resistance, and chemical resistance, the enamel composition according to embodiments may include 3 to 10% by weight of $MoO_3$ and 10 to 15% by weight of $TiO_2$.

The enamel composition according to embodiments does not include components of Ni and Co which may be coated on a buffer layer formed on a substrate of a steel plate and are relatively expensive. Therefore, the enamel composition according to embodiments may realize excellent cleaning performance and durability at a reasonable price.

The enamel composition according to embodiments has the above noted new composition ratio, so that cleaning of saccharide contaminants containing sugar is possible in a temperature range of 350 to 380° C. which is lower than that of the known enamel composition by a difference of about 100° C. Therefore, if the enamel composition according to embodiments is used, there are effects of energy conservation and reduction of cleaning time. In addition, the enamel composition according to embodiments allows oil-based contaminants to be cleaned at room temperature without soaking with water, so that cleanliness management of a cooking appliance may be easier.

Method for Preparing Enamel Composition

A method 100 for preparing an enamel composition according to embodiments may include providing materials for the enamel composition (110), the materials Including 20 to 50% by weight of $SiO_2$, 7 to 12% by weight of $B_2O_3$, one or more of $Li_2O$, $Na_2O$, or $K_2O$, and 10 to 20% by weight of NaF, 1 to 10% by weight of ZnO, and one or more of $MoO_3$, $Bi_2O_3$, or $CeO_2$, and 10 to 40% by weight of $TiO_2$, melting the materials (120), and quenching the melted materials (130), to form the enamel composition.

The materials may be sufficiently mixed, and then the materials melted. The materials may be melted in a temperature range of 1200 to 1400° C. Also, the materials may be melted for 1 to 2 hours. Thereafter, the melted materials may be quenched using a chiller, for example, by a quenching roller.

Cooking Appliance

The enamel composition according to embodiments may be coated on a surface of a target object. The target object may be a metal plate, a glass plate, a portion of a cooking appliance, or all of the above, for example. The enamel composition may be coated on an inner surface of a cavity of the cooking appliance or an inner surface of a door thereof, for example.

Referring to FIG. 1, an cooking appliance 1 according to embodiments may include a cavity 11 having a cooking space formed therein, a door 14 that selectively opens and closes the cooking space, at least one heating source 13, 15, 16 that provides heat to heat food or other items (hereinafter, collectively "food") in the cooking space, a buffer layer 19, 20 coated on an inner surface 12 of the cavity 11 or the door 14, and a coating layer 17, 18 formed by the enamel composition according to embodiments. The cavity 11 may be formed in the shape of a hexahedron.

The heating source 13, 15, 16 may include a convection assembly 13 that allows heated air to be discharged inside of the cavity 11, an upper heater 15 disposed on an upper portion of the cavity 11, and a lower heater 16 disposed on a lower portion of the cavity 11. The upper heater 15 and the lower heater 16 may be provided inside or outside of the cavity 11. The heating source 13, 15, 16 does not necessarily include the convection assembly 13, the upper heater 15, and the lower heater 16. That is, the heating source 13, 15, 16 may include any one or more of the convection assembly 13, the upper heater 15, and the lower heater 16.

Figure 2:
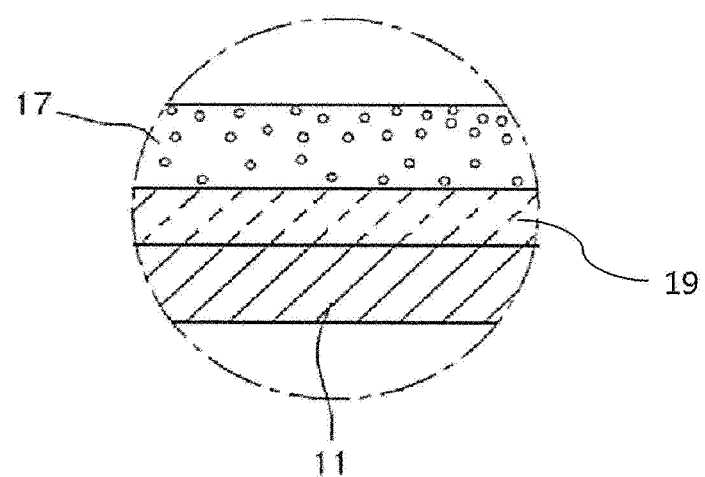
FIG. 2 is a partial enlarged cross-sectional view of a portion of an inner surface of a cavity of the cooking appliance according to FIG. 1.
Figure 3:
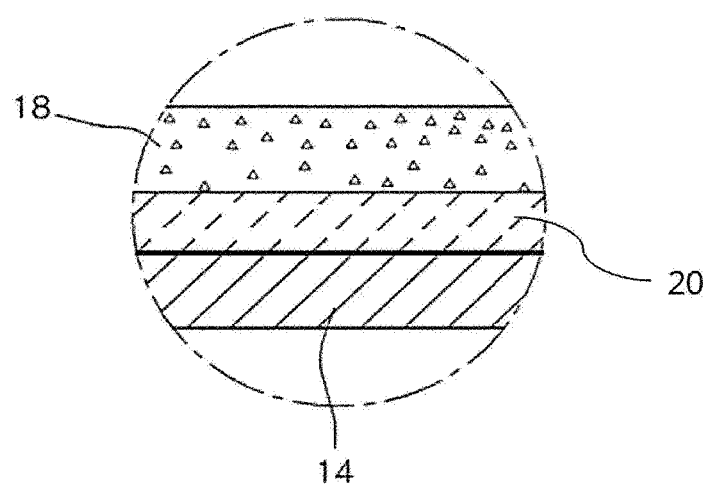
FIG. 3 is a partial enlarged cross-sectional view of a portion of an inner surface of a door of the cooking appliance according to FIG. 1.
Figure 4:
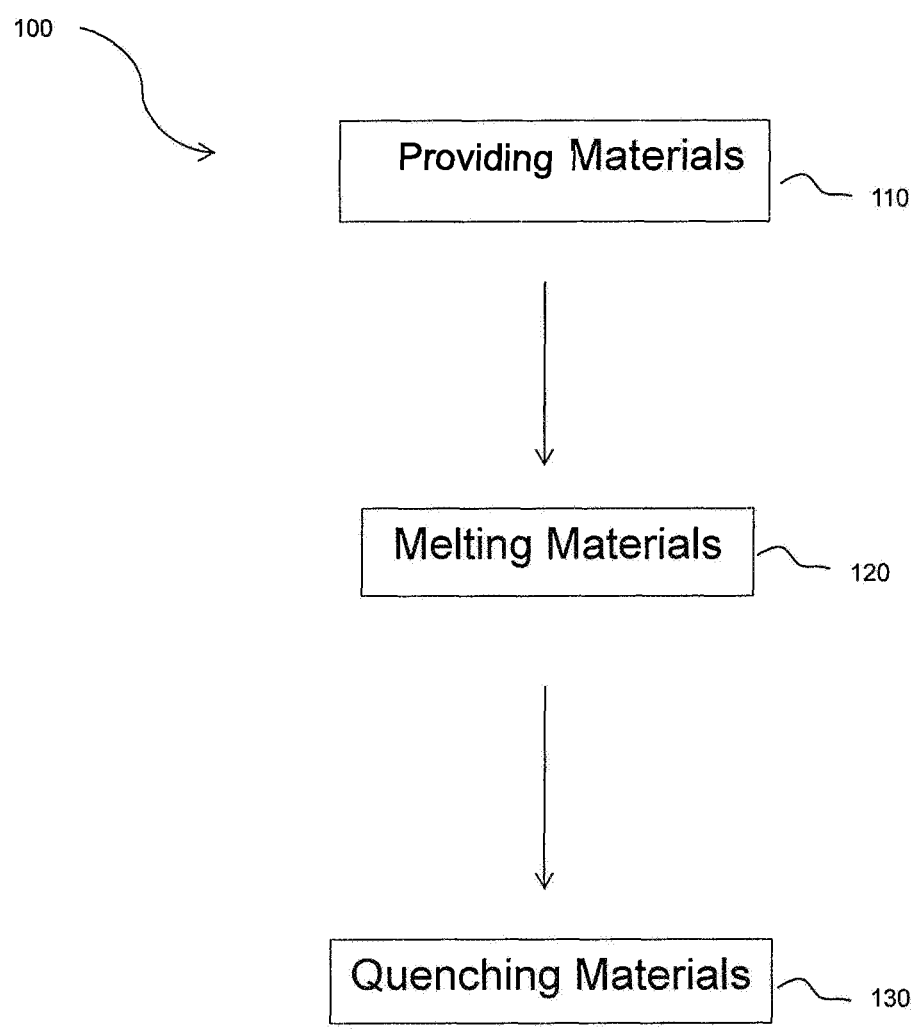
FIG. 4 is a flow chart of a method for preparing an enamel composition according to an embodiment.

Referring to FIGS. 2 and 3, the enamel composition according to embodiments may be coated on an inner surface of the cavity 11 or an inner surface of the door 14 of the cooking appliance 1 by a dry process or a wet process, for example. The cavity 11 and the door 14 may be formed as a metal plate. The buffer layer 19, 20 may be formed on a surface of the cavity 11 and the door 14, and the coating layer 17, 18 using the enamel composition according to embodiments may be coated on the buffer layer 19, 20.

The buffer layer 19, 20 may be formed as a coating layer having similar components with those of the enamel composition. Also, the buffer layer 19, 20 may be formed by a material, a coefficient of thermal expansion of which matches with that of a substrate of a steel plate, and may be formed by a material, adhesion to the substrate of the steel plate of which is excellent.

In the wet process, enamel composition materials are dispersed in an organic binder, and a mixture of the enamel composition materials and organic binder is milled in a ball mill, so that a glass frit may be prepared. In the wet process, enamel composition materials are dispersed in water ($H_2O$) and pigment, and a mixture of the enamel composition materials, water ($H_2O$), and pigment is milled in a ball mill, so that a glass frit may be prepared.

Thereafter, the glass frit according to the dry process and the wet process may be covered on the buffer layer by a spray method. The covered glass frit may be cancinated at a temperature range of 600 to 900° C. during 100 to 450 seconds and be coated on an inner surface of the cavity 11 or an inner surface of the door 14 of the cooking appliance 1.

Hereinafter, embodiments will be described with respect to examples.

Examples

Method for Preparation of Enamel Composition

An enamel composition having a composition ratio described in Table 1 below was prepared. A raw material of each component was sufficiently mixed in a V-mixer for 3 hours. Sodium carbonate ($Na_2CO_3$), potassium carbonate ($K_2CO_3$), and lithium carbonate ($Li_2CO_3$) were used as raw materials for $Na_2O$, $K_2O$, and $Li_2O$, respectively. With respect to the other components, the same components as that described in Table 1 were used. The mixed materials were melted at 1300° C. for 1 hour and 30 minutes, and quenched in a quenching roller, thereby yielding a glass cullet.

An initial particle size of the glass cullet yielded by the above process was controlled by a ball mill, the glass cullet was ground for about 5 hours using a jet mill, and then passed through a 325 mesh sheave (ASTM C285-88). The particle size was controlled in order that the frit that did not pass through the mesh sheave remained in a range of 1 g to 3 g, and powder that passed through the mesh sheave was used as an enamel composition frit.

TABLE 1

| Component (weight %) | Example | | | | | | | Comparative Example | | |
|---|---|---|---|---|---|---|---|---|---|---|
| | 1 | 2 | 3 | 4 | 5 | 6 | 7 | 1 | 2 | 3 |
| $SiO_2$ | 39.16 | 48 | 36 | 30.26 | 25.94 | 36.32 | 32.16 | 34.52 | 45.11 | 52.51 |
| $B_2O_3$ | 9.76 | 7.12 | 10.32 | 9.79 | 9.91 | 10.32 | 9.79 | 5.99 | 12.74 | 10.2 |
| $Na_2O$ | 10.25 | 11.95 | 10.11 | 11.59 | 11.82 | 10.11 | 11.63 | 13.45 | 7.2 | 9.5 |
| $K_2O$ | 5.52 | 4.13 | 4.09 | 3.87 | 3.94 | 5.24 | 0 | 7.24 | 5.6 | 6.4 |
| $Li_2O$ | 1.54 | 1.26 | 2.39 | 1.26 | 1.32 | 0 | 1.57 | 3.45 | 3.1 | 2.1 |
| NaF | 2.62 | 2.59 | 3.41 | 3.24 | 2.81 | 3.41 | 3.24 | 1.2 | 2.5 | 1.54 |
| $TiO_2$ | 21.17 | 19 | 13.32 | 12.68 | 15.93 | 13.37 | 12.9 | 12.44 | 9.78 | 0 |
| ZnO | 9.98 | 4 | 10 | 9.82 | 9.52 | 10 | 9.82 | 5.12 | 4.45 | 0 |
| $MoO_3$ | 0 | 1.95 | 4.85 | 8.24 | 6.71 | 4.72 | 9.64 | 4.22 | 9.52 | 4.56 |
| $Bi_2O_3$ | 0 | 0 | 4.18 | 4.98 | 8.75 | 4.18 | 4.98 | 8.45 | 0 | 9.42 |
| $CeO_2$ | 0 | 0 | 1.33 | 4.27 | 3.35 | 2.33 | 4.27 | 3.92 | 0 | 3.77 |

Preparation of Enamel Composition Sample

In advance, a low carbon steel sheet that is to be used for a sample and has 200×200 (mm) and 1 (mm) or less of thickness was prepared. A buffer layer having components described in Table 2 below was formed on the sheet. The buffer layer was prepared in the same method as that of the above noted enamel composition. A method forming the buffer layer on the above sheet Is the same as an after-described method of forming an enamel coating layer.

Next, frits prepared using the enamel composition according to Examples 1 to 7 and Comparative Examples 1 to 3 were sprayed on the buffer layer by using a corona discharge gun. A voltage of the corona discharge gun was controlled in a condition of 40 kV to 100 kV, and an amount of the frits sprayed on a low carbon steel sheet was 300 g/m². The low carbon steel, on which the frits were sprayed was cancinated in a temperature condition of 830° C. to 870° C. for 300 to 450 seconds, so that a coating layer was formed on one surface of the low carbon steel. The coating layer was formed in about 80 μm to 250 μm of thickness. Based on the above, a sample according to Examples 1 to 7 and Comparative Examples 1 to 3 was prepared.

TABLE 2

| Component (weight %) | Buffer layer |
|---|---|
| $SiO_2$ | 48.8 |
| $B_2O_3$ | 10.1 |
| $Na_2O$ | 15 |
| $K_2O$ | 10.7 |
| $Li_2O$ | 4.2 |
| NaF | 6 |
| $TiO_2$ | 2.4 |

TABLE 2-continued

| Component (weight %) | Buffer layer |
|---|---|
| $Co_3O_4$ | 1 |
| NiO | 0.5 |
| $Fe_2O_3$ | 0.8 |
| $MnO_2$ | 0.5 |

Example

With respect to the sample according to the Examples and Comparative Examples, performance evaluation was performed as below, a result thereof was described in Table 3.

1. Evaluation for Cleaning Performance with Respect to Chicken's Oil Contaminants.

As a contaminant, 1 g of a chicken's oil was evenly and thinly spread with a brush on a surface of the sample where the enamel composition was coated on a metal substrate (100×100 (mm)). Next, the sample on which the contaminant was spread was put into a thermostat, so that the contaminant was fixed thereto in a temperature range of 250 to 290° C. for 1 hour. After fixation of the contaminant, the sample was naturally cooled and a level of hardness was confirmed. Next, the chicken's oil was wiped using a force of 3 kgf or less using a frying pan-only scrub brush wet with cold water. A portion wiped on a surface of the contaminated sample was uniformized using a bar, a diameter of which was 5 cm and a bottom of which was flat.

2. Cleaning Performance for Cherry Pie Contaminants

As a contaminant, 1 g of a cherry pie was evenly and thinly spread with a brush on a surface of the sample where the enamel composition was coated on the metal substrate (100×100 (mm)). Next, the sample on which the contaminant was spread was put into a thermostat, so that the contaminant was fixed thereto in a temperature range of about 220° C. for 30 minutes. After fixation of the contaminant, the sample was naturally cooled and the contaminant burned at 350° C. for 2 hours. Thereafter, the hardened contaminant of cherry pie was wiped using a force of 3 kgf or less using a frying pan-only scrub brush wet with cold water. A portion wiped on a surface of the contaminated sample was uniformized using a bar, a diameter was 5 cm and a bottom of which was flat.

A number of wiping reciprocation of the above samples was measured wherein the number was defined as a number of cleaning reciprocation. An index of cleaning performance evaluation was described in Table 3.

TABLE 3

| A number of cleaning reciprocation | LEVEL |
|---|---|
| 1~5 | LV. 5 |
| 6~15 | LV. 4 |
| 16~25 | LV. 3 |
| 26~50 | LV. 2 |
| 51~ | LV. 1 |

TABLE 4

| | Example | | | | | | | Comparative Example | | |
|---|---|---|---|---|---|---|---|---|---|---|
| | 1 | 2 | 3 | | | | | | | 3 |
| Cleaning performance with respect to chicken's oil | LV.4 | LV.4 | LV.4 | V.5 | V.5 | V.5 | V.5 | V.1 | V.2 | LV.2 |
| Cleaning performance with respect to cherry pie | LV.3 | LV.3 | LV.4 | V.4 | V.5 | V.4 | V.4 | V.2 | V.2 | LV.1 |

As described in Table 4, it was confirmed that cleaning performance was excellent in Examples according to embodiments.

The above comparative examples do not have an optimum silicate-based composition compared to the examples, so that it was confirmed that cleaning performance was reduced.

Embodiments disclosed herein provide a new enamel composition for which cleaning is possible at a low temperature condition compared to a high temperature condition needed for the known enamel composition. Further, embodiments disclosed herein provide a new enamel composition for which oil-based contaminants may be removed at room temperature without a soaking process using water. Furthermore, embodiments disclosed herein provide a new enamel composition for which there is no need to consider adhesion to a substrate in the form of a steel plate.

In order to provide an enamel composition where cleaning is possible at a low temperature condition compared to a high temperature condition needed for the known enamel composition, and also, oil-based contaminants may be removed at room temperature without a soaking process using water, the enamel composition according to embodiments may include 20 to 50% by weight of $SiO_2$, 7 to 12% by weight of $B_2O_3$, and one or more of $Li_2O$, $Na_2O$, or $K_2O$, and 10 to 20% by weight of NaF, 1 to 10% by weight of ZnO, and one or more of $MoO_3$, $Bi_2O_3$, or $CeO_2$, and 10 to 40% by weight of $TiO_2$. Also, the enamel composition according to embodiments may include 3 to 10% by weight of $MoO_3$ and 10 to 15% by weight of $TiO_2$.

The enamel composition according to embodiments may include a new silicate-based glass composition, so that cleaning is possible at a low temperature condition, a temperature of which is lower than that of a high temperature condition needed for the known enamel composition with a difference of approximately 100° C.

Also, with respect to the enamel composition according to embodiments, an oil-based contaminant may be cleaned at room temperature without a soaking process using water. Accordingly, if the enamel composition according to embodiments is used, a user may clean a cooking appliance simply, so that cleanliness of the cooking appliance may be enhanced.

Further, the enamel composition according to embodiments particularly controls components of Mo and Ti, so that an excellent cleaning performance is obtained with respect to all contaminants. In addition, the enamel composition according to embodiments may be coated on a buffer layer formed on a substrate of a steel plate, so that there is no need to consider adhesion to the substrate of the steel plate.

Embodiments are not limited by the disclosed embodiments and it is obvious that various modifications may be made by one having ordinary skill in the art within the scope of the technical spirit. Further, even though acting and effects according to embodiments are not definitely described in the description of embodiments, it is certain that predictable effects resulted from the relevant configuration should be also admitted.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" Includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An enamel composition, comprising:
   20 to 50% by weight of silicon dioxide ($SiO_2$);
   7 to 12% by weight of boron oxide ($B_2O_3$);
   one or more of lithium superoxide ($Li_2O$), sodium oxide ($Na_2O$), or potassium oxide ($K_2O$), and 10 to 20% by weight of sodium fluoride (NaF);
   1 to 10% by weight of zinc oxide (ZnO); and
   one or more of molybdenum oxide ($MoO_3$), bismuth oxide ($Bi_2O_3$), or cerium dioxide ($CeO_2$), and 10 to 40% by weight of titanium dioxide ($TiO_2$).

2. The enamel composition of claim 1, wherein the $MoO_3$ is 3 to 10% by weight.

3. The enamel composition of claim 1, wherein the $TiO_2$ is 10 to 15% by weight.

4. The enamel composition of claim 1, wherein the $TiO_2$ is 10 to 15% by weight.

5. A cooking appliance, comprising:
   a cavity in which a cooking space is formed;
   a door that selectively opens and closes the cooking space;
   at least one heating source that provides heat to the cooking space;
   a buffer layer coated on an inner surface of the cavity or an inner surface of the door; and
   a coating layer coated on the buffer layer and formed using the enamel composition according to claim 1.

6. A method for preparing an enamel composition, comprising:
   providing materials for the enamel composition, the materials comprising:
   20 to 50% by weight of silicon dioxide ($SiO_2$);
   7 to 12% by weight of boron oxide ($B_2O_3$);
   one or more of lithium superoxide ($Li_2O$), sodium oxide ($Na_2O$), or potassium oxide ($K_2O$) and 10 to 20% by weight of sodium fluoride (NaF);
   1 to 10% by weight of zinc oxide (ZnO); and
   one or more of molybdenum oxide ($MoO_3$), bismuth oxide ($Bi_2O_3$), or cerium dioxide ($CeO_2$), and 10 to 40% by weight of titanium dioxide ($TiO_2$);
   melting the materials; and
   quenching the melted materials to form the enamel composition.

7. The method of claim 6, wherein the $MoO_3$ is 3 to 10% by weight.

8. The method of claim 6, wherein the $TiO_2$ is 10 to 15% by weight.

9. A cooking appliance, comprising:
   a cavity in which a cooking space is formed;
   a door that selectively opens and closes the cooking space;
   at least one heating source that provides heat to the cooking space;
   a buffer layer coated on an inner surface of the cavity or an inner surface of the door; and
   a coating layer coated on the buffer layer and formed using the method for preparing the enamel composition according to claim 6.

10. The method in claim 6, wherein the melting of the materials includes melting the materials at about 1,200 to 1,400° C. for about one to two hours.

11. The method in claim 10, wherein the melting of the materials includes melting the materials at about 1,300° C. for about 1.5 hours.

12. The method of claim 6, further comprising:
    mixing the materials for about 3 hours before melting the materials.

13. The method of claim 6, wherein the quenching of the melted material includes quenching the melted materials using a quenching roller.

14. The method of claim 6, further comprising:
    applying the enamel composition to at least one of an inner surface of a cavity of a cooking appliance or an inner surface a door of the cooking appliance.

15. The method of claim 14, wherein the applying of the enamel composition includes applying the enamel composition by a dry process that includes dispersing the quenched materials for the enamel composition in an organic binder, milling the quenched materials for the enamel composition and the organic binder to prepare a frit, and applying the frit to the at least one of the inner surface of the cavity of the cooking appliance or the inner surface the door of the cooking appliance.

16. The method of claim 14, wherein the applying of the enamel composition includes applying the enamel composition by a wet process that includes dispersing the quenched materials for the enamel composition in water and a pigment, milling the materials for the enamel composition, water, and the pigment to prepare a frit, and applying the frit to the at least one of the inner surface of the cavity of the cooking appliance or the inner surface the door of the cooking appliance.

17. The method of claim 14, wherein the applying of the enamel composition includes:
   spraying a frit that includes the quenched materials for the enamel composition to the at least one of the inner surface of the cavity of the cooking appliance or the inner surface the door of the cooking appliance; and
   firing the sprayed frit.

18. The method of claim 17, wherein the spraying of the frit includes spraying about 300 g/m² of the frit onto a steel sheet substrate.

19. The method of claim 17, wherein the spraying of the frit includes directly applying a single layer of the frit onto a steel sheet substrate without using an interposing buffer layer.

20. The method of claim 17, wherein the frit is applied to form a coating layer having a thickness of about 80 to 250 µm, and the frit is fired at about 600 to 900° C. for about 100 to 450 seconds.

\* \* \* \* \*